Patented Apr. 8, 1941

2,237,292

UNITED STATES PATENT OFFICE 2,237,292

PROCESS FOR PRODUCING OLEFIN DIMERS

Richard M. Deanesly, Berkeley, Calif., assignor to Shell Development Company, San Francisco, Calif., a corporation of Delaware No Drawing. Application March 22, 1937, Serial No. 132,344

14 Claims. (Cl. 260—683)

This invention relates to the polymerization of tertiary olefins, i. e. olefins containing an unsaturated tertiary carbon atom, and, more specifically, is concerned with those methods wherein olefins are polymerized in solution in suitable mineral acid acting acids. It deals particularly with an improved process for producing di-isobutylene from aqueous sulfuric acid solutions of isobutylene.

An important object of my invention is the provision of an improved polymerization procedure whereby the yield of di-isobutylene may be improved at the expense of higher polymerization products. In this sense the process of my invention is an improvement upon the procedures described in United States Patents 1,889,952 and 2,007,159.

I have found that the di-isobutylene content of polymerization products obtainable by heating absorption products of isobutylene in sulfuric acid may be materially increased by rapid heating of the absorption product of polymerization temperature. Prolonged heating, such as has been used by the prior art, favors the formation of trimers and higher polymerization products. In order to substantially decrease such undesirable products, the period of heating should not exceed 5 minutes and more preferably is not more than 1 minute. The use of superatmospheric pressures and proper adjustment of the acid concentration are also beneficial.

Other factors must also be considered when choosing the most desirable operating conditions in any particular case. The influence of temperature depends upon the acid concentration used and is more pronounced at lower acidities than with acid of 60 to 70% strength. With 60 to 70% sulfuric acid the polymer of highest di-isobutylene content was obtained in the range of about 100° to 120° C. and the curve of di-isobutylene content vs. temperature was quite flat, while with 55% acid the yield dropped off more sharply on both sides of the range of about 110° to 125° C. However provided the heating is rapid and of short duration satisfactory results may be obtained at temperatures from 95 to 140° C. without difficulty. The rate of reaction, of course, increases with the temperature and for high conversions high temperatures are desirable. Below 85° C. the reaction rate is so slow that the heating must be prolonged and increasing amounts of trimers and higher polymerization products are obtained. Complete polymerization of the absorbed isobutylene content is unnecessary. It requires increased heating times with decreased dimer yields. Furthermore since the absorbed isobutylene is present as tertiary butyl alcohol it does not interfere with, but actually facilitates, the absorption of further amounts of isobutylene when the acid is recycled to the absorption unit.

A low acidity, e. g., about 50 to 55% $H_2SO_4$ on a hydrocarbon free basis, is particularly advantageous in promoting high yields of di-isobutylene. Since acid of this concentration does not absorb isobutylene very readily, I find it advantageous to carry out the absorption step with 60% to 70% acid and dilute the resulting absorption product before or during polymerization to bring the acid concentration within the desired lower range. It is not necessary to use the lower acid concentration, however, as the process of my invention can be carried out using the same concentration of acid on a hydrocarbon free basis in the polymerization as is employed for absorption without material loss of isobutylene through excessive formation of higher polymers by proper shortening of the polymerization time and in such cases I most preferably use 63 to 65% $H_2SO_4$. In any case superatmospheric pressures are preferred during polymerization as they directly increase the total yield by suppression of isobutylene regeneration and also indirectly improve the di-isobutylene yield by making it practical to operate at higher temperatures and/or lower acid concentrations.

The rapid, short heating of the absorption product, which is an essential feature of my invention, may be effected in a number of different ways including, for example, rapid heating of the absorption product as it is pumped through a suitably heated coil of small diameter. The process has been successful when the linear velocity of the feed through the coil was about 0.2–0.4 foot per second, insuring turbulent flow, and a cooling coil was provided directly after the heating coil. Batch mixers may even be used provided provision is made for the rapid transfer of a large amount of heat, most advantageously together with highly efficient forced agitation. Better results may be obtained however, by pumping the absorption product through a heated coil or the like, into an unheated tank which may advantageously be packed with ceramic rings, for example, and which is preferably fed from the top. By this method of operation not only are the corrosion difficulties reduced compared with processes using coil polymerizers alone or mechanically agitated mixers, but also high yields of olefin dimers are obtained as a result of the very rapid rise in the temperature of the solution to polymerization temperature and the more favorable ratio of hydrocarbon to acid which exists in the waiting tank as a result of the more rapid settling of the acid phase whereby formation of higher polymers are reduced. Another suitable procedure is to mix the absorption product with steam under pressure as in this manner not only is the heating very rapid and easily controlled with the desired short times requires but also the heat of reaction is thus efficiently supplied and the acid concentration easily regulated throughout the process. In this manner conditions favoring rapid polymerization and prompt removal of the resulting polymer from further contact with the acid, are most advantageously attained. This procedure has the added practical advantage of eliminating the pumping of corrosive acid solutions, since by the use of Venturi type steam injectors, for example, all moving parts may be avoided while still securing the necessary agitation of the acid solution.

The following examples illustrating specific applications of my invention show the advantages which may be thereby obtained compared with prior procedures.

Example I

A solution analyzing 42.5% isobutylene, 37.1% $H_2SO_4$ and 20.4% water representing the absorption of two mols of isobutylene per mol of sulfuric acid, in sulfuric acid of 64.5% strength, was fed through a steam jacketed coil made of 20 feet of ⅜ inch copper tubing. The heating coil was connected on the outlet side to a water cooled cooler and the throughput rate was controlled by a valve after the cooler. In comparative runs in which the pressure in the coil was 180 pounds gauge, the following results were obtained.

| | | |
|---|---|---|
| Feed rate, cc./min | 83.8 | 46.9 |
| Temperature, °C | 115 | 108 |
| Residence time, min | 3.3 | 6.0 |
| Polymer composition: | | |
| Di-isobutylene (wt. per cent) | 82.3 | 79.4 |
| Tri-isobutylene (wt. per cent) | 17.7 | 20.6 |

Example II

A sulfuric acid solution analyzing 27.1% isobutylene, 47.3% $H_2SO_4$ and 25.6% water corresponding to the absorption of one mol of isobutylene per mol of sulfuric acid of 65% initial concentration, was used in batch experiments in a steel turbo mixer provided with a very efficient stirrer and internal heating coils. The acid liquor was placed in the mixer and the stirrer started before the steam was turned on the heating coils. There was less than ¼ min. time lag between admission of steam and temperature and pressure rise in the charge. After the desired contact time, cooling water was turned on in place of the steam. The following results were obtained for two runs at different residence times in which inert paraffinic hydrocarbon was present with the charge.

| | | |
|---|---|---|
| Concentration of regenerated acid, wt. per cent | 65.5 | 64.8 |
| Maximum temperature, °C | 73 | 84 |
| Maximum pressure lbs., gauge | 160 | 30 |
| Contact time, min | 5 | 15 |
| Di-isobutylene in polymer, wt. per cent | 85–88 | 81–82 |

Example III

Tests made in a plant consisting of a coil of ⅜ inch copper tubing of about 0.1 gallon capacity enclosed in a steam jacket and connected to a 6 inch unheated vertical copper pipe packed with ¾ inch ceramic rings and having a capacity of 3.3 gallons free space. The feed was the absorption product obtained by treating a butane-butene fraction containing 18% isobutylene and 48% total olefins with 65% sulfuric acid at about 30° C., which was diluted with a small amount of water.

| | |
|---|---|
| Pressure, lbs. gauge | 220 |
| Temperature, °C | 105 |
| Residence time in polymerizer coil, sec | 9 |
| Rate of thruput, gals./hr | 41 |
| Composition of feed: | |
| Isobutylene wt., per cent | 25.7 |
| Sulfuric acid wt., per cent | 39.3 |
| Water wt. per cent | 35.0 |
| Concentration of regenerated $H_2SO_4$, per cent | 52.9 |
| Di-isobutylene in polymer produced, wt. per cent | 88.0 |

Example IV

To an apparatus consisting of a coil of ⅜-inch copper tubing of about 0.1 gallon capacity connected to a 6-inch vertical copper pipe packed with ¾ inch ceramic rings and having a capacity of 3.3 gallons free space; the entire apparatus being insulated to minimize loss of heat; was fed a sulfuric acid solution analyzing 26.4 per cent isobutylene, 47.9 per cent sulfuric acid and 25.7 per cent water, the acid concentration of which is 65 per cent on a hydrocarbon-free basis. Saturated steam at 200° C. (211 lbs. gauge) was mixed with the acid solution at the point of entrance to the coil, the flow of steam being controlled by a valve so that the mixture attains a temperature of 100° C.

| | |
|---|---|
| Feed rate, gal./hr | 46 |
| Concentration of regenerated acid, wt. per cent | 58.3 |
| Maximum temperature, °C | 100 |
| Pressure, lbs. gauge | 200 |
| Di-isobutylene in polymer, wt. per cent | 89.2 |

While my invention has been discussed with more particular reference to the polymerization of absorption products of isobutylene in aqueous sulfuric acid, it is also applicable to the treatment of solutions of other tertiary olefins such as trymethyl ethylene, unsymmetrical methyl ethyl ethylene, tetramethyl ethylene and the like, in the same or other strong polybasic mineral acids including, for example, aqueous phosphoric and like acids. Furthermore, instead of absorbing selectively a single tertiary olefin, a plurality of olefins may be absorbed and the resulting solution polymerized by the process of my invention. Thus solutions of two or more tertiary olefins, whether isomeric or not, may be used or solutions containing both tertiary and secondary olefins may be employed. Solutions of the latter type may be most advantageously prepared by the procedure disclosed in United States Patent 2,060,143, although they may also be produced by simultaneous absorption of the two different types of olefins. The polymerization of such absorption products by the process of my invention, particularly when high temperatures are used, results in interpolymerization of these olefins. Thus absorption products containing isobutylene and secondary butenes polymerized by my method give not only di-isobutylene but also increased yields of polymers boiling above 105° C., particularly from 105 to 140° C. made up of one molecule of isobutylene joined with one molecule of a secondary butylene. The expression "olefin dimers" as used in the accompanying claims will therefore be understood to refer, unless otherwise indicated, to polymerization products composed of two molecules of starting olefin whether such molecules be alike or different. The isoheptylenes resulting from the reaction of isobutylene with propylene, and isononylenes from isobutylene with secondary and/or tertiary amylenes, and the like, are included as well as the dimers resulting from the polymerization of a single olefin, which dimers usually accompany to a greater or less degree the formation of dimers from unlike olefins. These interpolymerization products of isobutylene with secondary butenes have lower octane ratings than di-isobutylene but in the manufacture of anti-knock motor fuel their production is highly advantageous since the octane rating of the fuel which can be produced from a given amount of isobutylene and secondary butylenes by the process of my invention is higher than that of the blend obtained by mixing the polymers produced by separate polymerization of the same amount of isobutylene and secondary butylenes.

It is thus evident that the process of my invention offers many advantages over prior methods of polymerizing tertiary olefin containing acid solutions. By its use the yield of valuable olefin dimers may be increased and that of the less suitable higher polymerization products reduced. This is a very important practical advantage as even small increases in the dimer content of the product may represent the difference between profit and loss on the whole operation, particularly where, as in anti-knock gasoline manufacture, the product must be sold as cheaply as possible. I have, however, been able to obtain very material increases in dimer yields and have succeeded in producing polymer containing 95.6% di-isobutylene. My process is highly flexible and may be carried out in many different ways without departing from the spirit of my invention which is not to be regarded as limited to the details of operation disclosed nor by the soundness of the theories advanced in explanation of the improved results attained, but only by the terms of the accompanying claims, in which it is my intention to claim all novelty inherent therein as broadly as possible in view of the prior art.

I claim as my invention:

1. A process for producing olefin dimers which comprises heating a solution of a tertiary olefin in an acid of the group consisting of sulfuric and phosphoric acids of about 50% to about 70% concentration at a temperature between 85° C. and 140° C. for a time sufficient to effect at least partial polymerization of the olefin but not more than 5 minutes overall heating time and separating the resulting polymerization product.

2. A process for producing di-isobutylene which comprises heating a solution of isobutylene in an acid of the group consisting of sulfuric and phosphoric acids of about 50% to about 70% concentration at a temperature between 85° C. and 140° C. for a time sufficient to effect at least partial polymerization of the isobutylene but not more than 5 minutes overall heating time and separating the resulting polymerization product.

3. A process for producing olefin dimers in accordance with claim 2 in which the solution is brought to the polymerization temperature within a period of at least 1 minute.

4. A process for producing di-isobutylene which comprises heating a solution of isobutylene in sulfuric acid of about 50% to about 70% concentration at a temperature between 85° C. and 140° C. for a time sufficient to effect at least partial polymerization of the isobutylene but not more than 5 minutes overall heating time and separating the resulting polymerization product.

5. In the process of producing polymers of isobutylene by making a solution thereof by contact with an acid absorption medium and then heating the solution to effect polymerization, the method of obtaining high yields of di-isobutylene which comprises using sulfuric acid of about 60–70% concentration as the absorption medium, and using a polymerization temperature between the approximate limits of 85° and 120° C. for a time not substantially more than one minute.

6. In a process of producing hydrocarbons boiling in the gasoline range by contacting tertiary olefin-containing hydrocarbon with an acid of the group consisting of sulfuric and phosphoric acids of about 50% to about 70% concentration and heating the resulting olefin absorption product for a time not longer than five minutes, the improvement which comprises maintaining said absorption product at a temperature between the approximate limits of 85° to 140° C. and under a superatmospheric pressure sufficient to substantially restrict regeneration of mono-olefin therefrom during said heating.

7. In a process of producing hydrocarbons boiling in the gasoline range by contacting tertiary olefin-containing hydrocarbon with an acid of the group consisting of sulfuric and phosphoric acids of about 50% to about 70% concentration and heating the resulting olefin absorption product for a time not longer than five minutes, the improvement which comprises directly injecting steam into said absorption product and maintaining the heated mixture at a temperature between 85° and 140° C. and under a substantial superatmospheric pressure during said heating.

8. In the process of producing polymers of isobutylene by making a solution thereof by contact with an acid absorption medium and then heating the solution to effect polymerization, the method of obtaining high yields of di-isobutylene which comprises using sulfuric acid of about 60–70% concentration as the absorption medium and using a polymerization temperature between the approximate limits of 85° C. and 120° C. for a time not longer than five minutes.

9. A process as in claim 8 wherein the acid concentration is about 65% and the temperature is about 120° C.

10. In a process of producing hydrocarbons boiling in the gasoline range by contacting tertiary olefin-containing hydrocarbon with an acid of the group consisting of sulfuric and phosphoric acids of about 50% to about 70% concentration and heating the resulting olefin absorption product for a time not longer than five minutes, the improvement which comprises directly injecting a heating medium into said absorption product and maintaining the heated mixture at a temperature between 85° C. and 140° C. and under a substantial superatmospheric pressure during said heating.

11. In the process of producing polymers of isobutylene and other olefins by making a solution thereof by contact with an acid absorption medium and then heating the solution to effect polymerization, the method of obtaining high yields of di-isobutylene and other polymers which comprises using sulfuric acid of about 60%–70% concentration as the absorption medium and using a polymerization temperature between the approximate limits of 85° C. and 120° C. for a time not longer than five minutes.

12. A process as in claim 11 wherein the heating time for effecting polymerization is not substantially longer than one minute.

13. In the process of producing polymers boiling in the range suitable for use as motor fuel comprising bringing a hydrocarbon fraction containing isobutylene and normal butylenes into contact with sulfuric acid of about 60%–70% concentration for a sufficiently long time to cause the sulfuric acid to dissolve both isobutylene and at least one normal butylene, then heating the sulfuric acid extract to a temperature between the approximate limits of 85° C. and 120° C. for a time not longer than five minutes.

14. A process as in claim 13 in which the heating time for polymerization is not substantially longer than about one minute.

RICHARD M. DEANESLY.